No. 698,261. Patented Apr. 22, 1902.
A. C. CREHORE & G. O. SQUIER.
SUBMARINE CABLE TELEGRAPHY.
(Application filed Oct. 25, 1898. Renewed Oct. 5, 1901.)
(No Model.) 4 Sheets—Sheet 1.
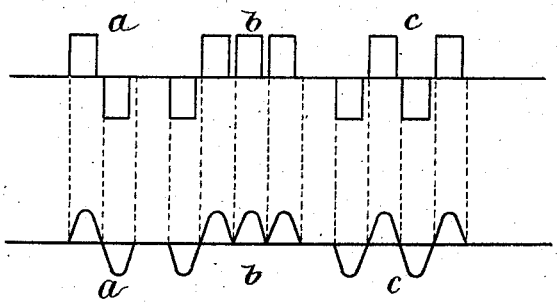
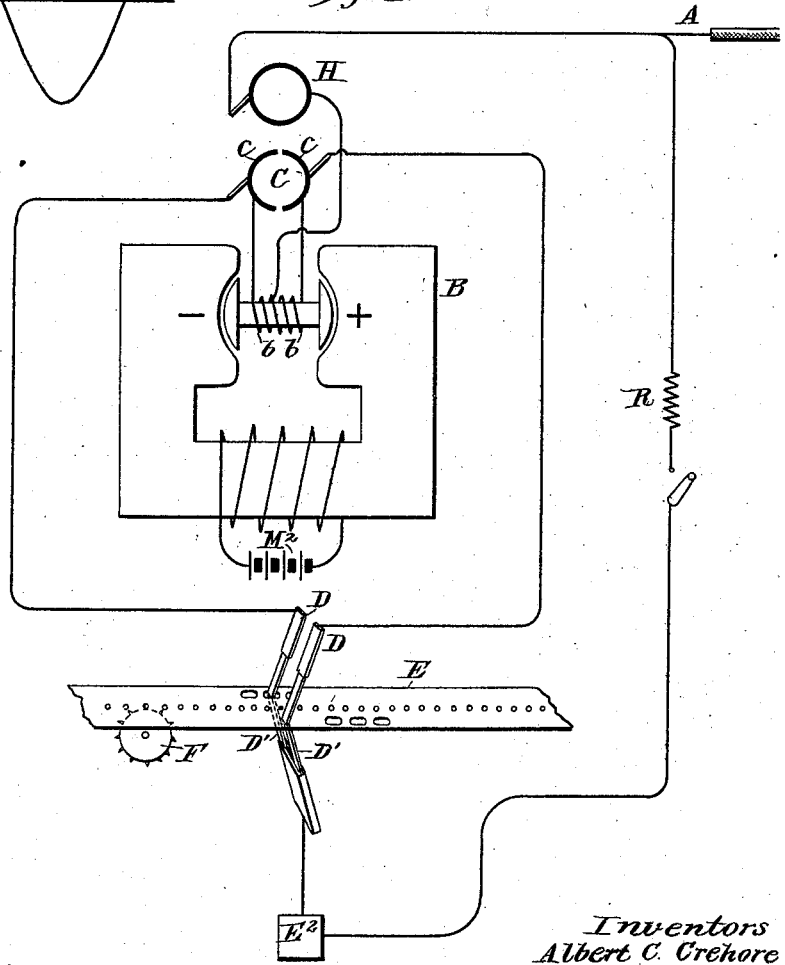
Witnesses:
C. L. Belcher
H. N. Capel
Inventors
Albert C. Crehore
George O. Squier
By
C. L. Townsend
Attorney

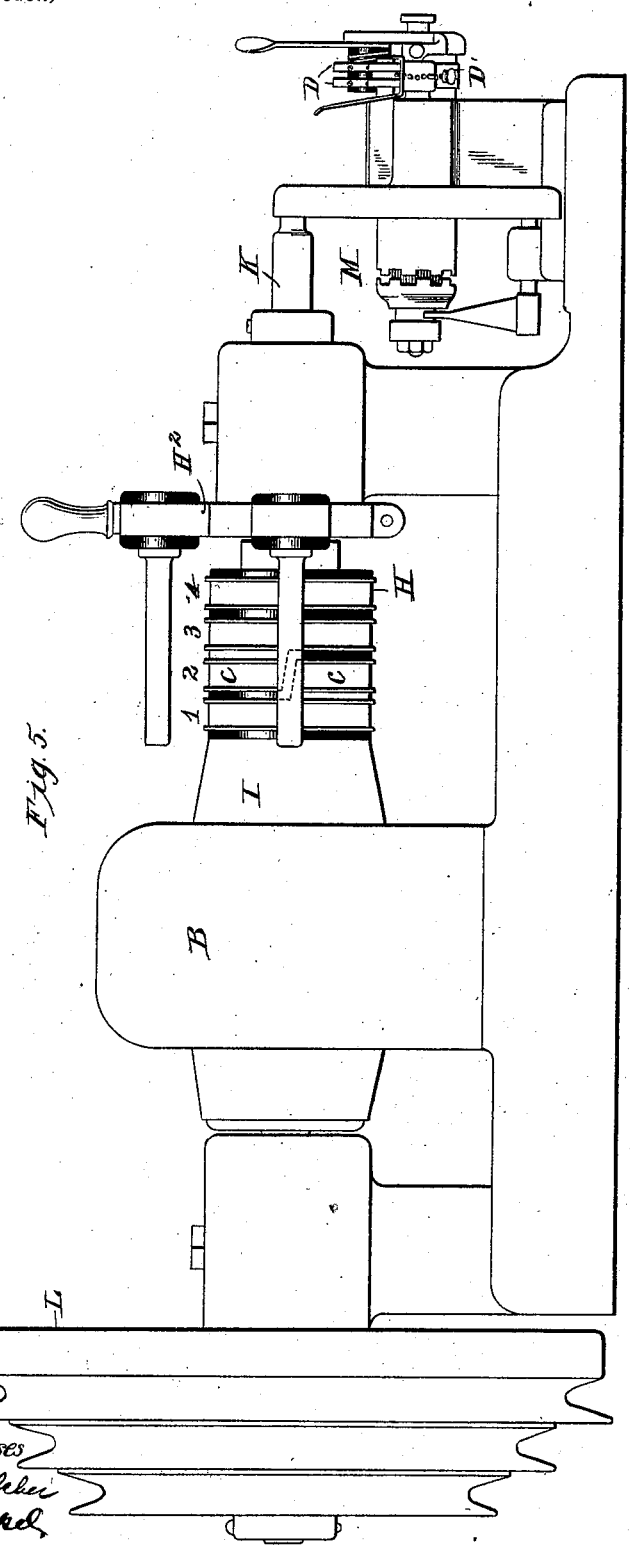

No. 698,261. Patented Apr. 22, 1902.
A. C. CREHORE & G. O. SQUIER.
SUBMARINE CABLE TELEGRAPHY.
(Application filed Oct. 25, 1898. Renewed Oct. 5, 1901.)
(No Model.) 4 Sheets—Sheet 3.
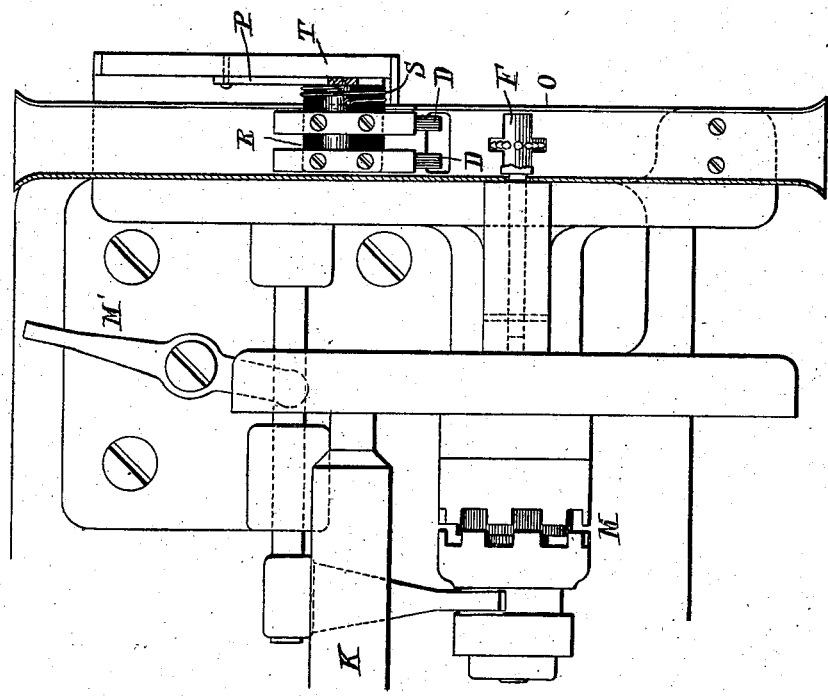
Witnesses:
Inventors
Albert C. Crehore
George O. Squier
By
Attorney No. 698,261. Patented Apr. 22, 1902.
A. C. CREHORE & G. O. SQUIER.
SUBMARINE CABLE TELEGRAPHY.
(Application filed Oct. 25, 1898. Renewed Oct. 5, 1901.)
(No Model.) 4 Sheets—Sheet 4.
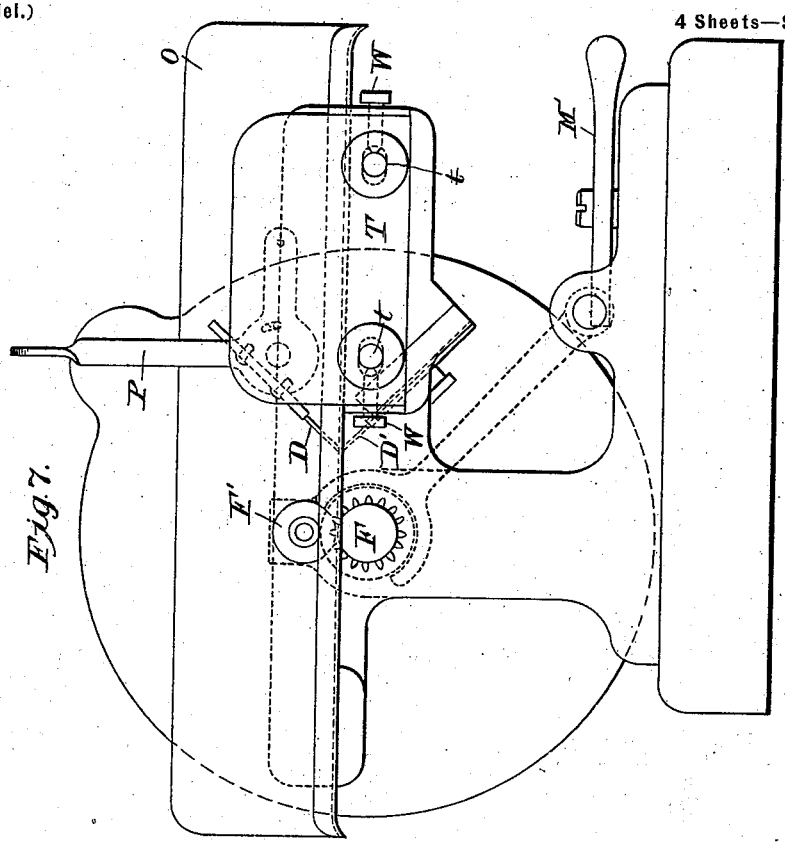
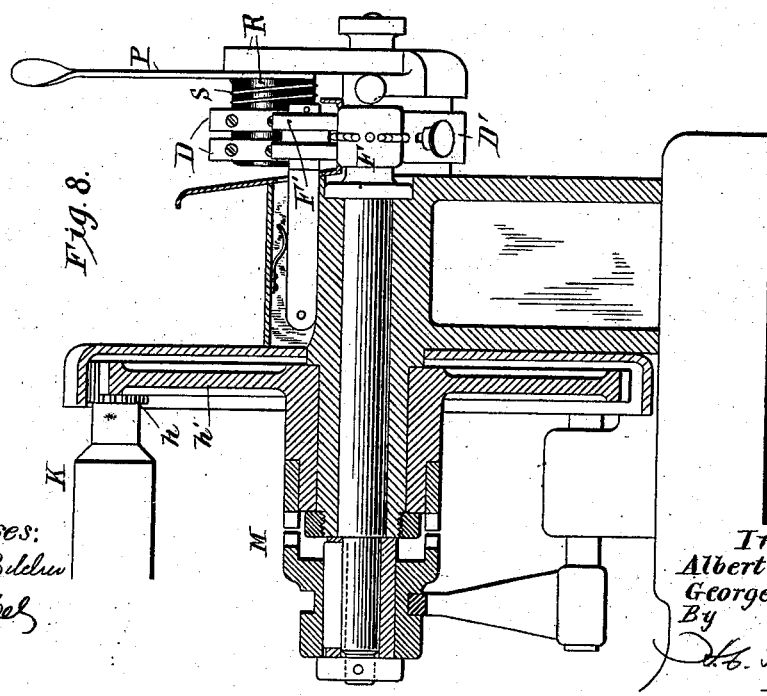
Witnesses:
Inventors
Albert C. Crehore
George O. Squier
By
Attorney

UNITED STATES PATENT OFFICE.

ALBERT C. CREHORE, OF HANOVER, NEW HAMPSHIRE, AND GEORGE O. SQUIER, OF THE UNITED STATES ARMY, ASSIGNORS TO THE CREHORE-SQUIER INTELLIGENCE TRANSMISSION COMPANY, OF CLEVELAND, OHIO, A CORPORATION OF OHIO.

SUBMARINE-CABLE TELEGRAPHY.

SPECIFICATION forming part of Letters Patent No. 698,261, dated April 22, 1902.

Application filed October 25, 1898. Renewed October 5, 1901. Serial No. 77,703. (No model.)

*To all whom it may concern:*

Be it known that we, ALBERT C. CREHORE, a citizen of the United States, and a resident of Hanover, in the county of Grafton and State of New Hampshire, and GEORGE O. SQUIER, lieutenant-colonel, Signal Corps, United States Army, have invented certain new and useful Improvements in Submarine-Cable Telegraphy, of which the following is a specification.

Our invention or discovery relates to the transmission of intelligence over submarine cables, in which, as is well known, the speed of transmission is very slow as compared with the speed on land lines due to the comparatively large distributed electrical capacity of a submarine cable despite the continued search for appliances designed to increase the speed and the legibility of the received signals. Heretofore in this branch of telegraphy the signals have been transmitted by applying to the cable an electromotive force which is at its maximum at the beginning of a pulse, and the waves of electromotive force impressed upon the circuit, graphically represented, appear as in the broken line, Fig. 1, the characteristic feature of which is that the waves are "square-topped." We have discovered that the speed of transmission is increased over that which it has heretofore been possible to attain by simply abandoning the use of the square-top wave of impressed electromotive force and substituting therefor an electromotive force which does not rise suddenly and fall off abruptly, but, on the contrary, varies gradually and continuously from zero through a maximum and back to zero gradually and continuously.

Graphically the waves of impressed electromotive force employed according to our improved system are represented approximately as in Figure 2 of the accompanying drawings, wherein we represent two semiwaves of opposite sign, respectively. The same form of electromotive force when varied as to the succession of the individual waves or pulses for the purpose of transmitting the letters "A" and "B" of the international code is represented in Fig. 3.

In practicing our discovery the electromotive force may be generated in any desired way; but it is preferably generated by a dynamo or magneto-electric machine. Preferably said machine is constructed to generate a varying electromotive force of sine-wave form. When the electromotive force is generated by a machine as in the case of an alternating electromotive force, the control thereof, so that the sinuses may be impressed on the circuit at the desired times and intervals, may be effected in any desired manner, manually or automatically; but by preference we impress them automatically by means of a perforated tape.

In the accompanying drawings, Fig. 1 is a graphic delineation of the form of varying electromotive force heretofore employed in transmitting the letters "A," "B," and "C" over a cable using the present international code. Fig. 2 shows a complete alternating electromotive-force wave. Fig. 3 represents the impressed electromotive-force waves used according to our discovery to transmit the letters "A" and "B" using the present international code. Fig. 4 is a general diagram of one form of apparatus which may be used in telegraphing over submarine cables according to our improved method. Fig. 5 shows in side elevation a part of a working apparatus which we have successfully used in practice. Fig. 6 is a plan of the transmitting end of the same apparatus. Fig. 7 is an end elevation of the apparatus. Fig. 8 is a vertical longitudinal section through the parts connecting the generator and the transmitter.

Referring to Fig. 4, A is the transmitting end of a submarine cable upon which the pulses are to be impressed in accordance with a code, and $E^2$ is the earth connection. B typifies a generator of alternating electromotive force of sine-wave form, being for that purpose provided with a suitable coil or coils rotated by any suitable power in a magnetic field. As shown, a shuttle-armature is provided and is wound with two coils $bb$, having a common connection to line through a ring H, revolving with the armature and collector-brush bearing on said ring, and at their other termini connected through the sides $c\ c$, respectively, of a pole-changer C on the armature-shaft with the brushes or terminals D D of the transmitting device, thereby delivering at each brush or terminal a sine-wave electromotive force of one sign for one brush and of the opposite sign for the other brush, so that there is continuously present at said transmitting part an electromotive force of either sign ready to be impressed upon the circuit. We show a shuttle form of armature; but it is preferable to use a form which more readily gives an electromotive force closely following the sine-wave form. The field in which the coils are rotated may be maintained in any desired way, as by a local generator $M^2$, supplying a field-coil of the machine. The circuit of the machine is completed to earth through perforations in a transmitting-tape E, upon which the brushes bear after the usual manner, the perforations being of such size that the current flowing shall in each case begin and terminate at zero, or approximately zero, and the tape being fed beneath the brushes at a speed synchronous with the production of the alternating electromotive force. For this purpose the tape is provided with a central row of feeding-perforations, as well understood in the art, to be engaged by a toothed wheel F, which runs in synchronism with the generator B. The perforations of the tape being made of proper length and the brushes having been properly adjusted longitudinally upon the tape, current-pulses of sine-wave form will be caused to flow on the cable, said pulses being the resultant of electromotive forces applied to the cable, as graphically illustrated in Fig. 3. In practice it is found that by the substitution of this form of electromotive force for the present square-topped form without alteration of any of the other elements of the present system the speed of working over a given cable is materially increased.

R typifies any adjustable or variable impedance forming a resistance-shunt to earth for the discharge of the cable.

Having described in general terms the character of the apparatus which may be employed, we will refer to the remaining figures of drawings, which show a suitable apparatus in its details and which will be readily understood from the following brief description.

Brushes D' and lever P, carrying brushes D D, are carried on a frame or plate T, supported on pins or studs $tt$, which project from a suitable supporting arm or bracket. The frame T is capable of longitudinal adjustment by means of set-screws W, carried by it for the purpose of adjusting the position of the brush-tips with relation to the perforations in the tape, and thereby determining the instant at which circuit shall be made and broken in the electromotive-force wave developed by the armature.

I is the armature, K the armature-shaft, and L the driving-pulley. Upon the armature-shaft and properly insulated therefrom are the four rings numbered 1 2 3 4, upon which bear suitable collecting-brushes. (Not shown, but supported from a suitable brush-holder $H^2$.) Ring 4 serves for connection of one or the common terminal of the armature-coil system and corresponds to ring H of Fig. 4. Ring 2 is subdivided to furnish the two sides $cc$ of the pole-changer, upon which bear the two brushes connected to the transmitter, and the halves of said ring constitute, in effect, parts, respectively, of the two idle rings 1 3, to which the terminals of the armature-coil system of opposite sign, respectively, may be connected. Said rings are idle in the operation of the apparatus for the purpose before described; but the application of suitable brushes to them will furnish an electromotive force (alternating) which is the sum of that furnished from the brushes bearing on ring $c\ c$ and H.

Shaft K carries a pinion $h$, that gears with gear-wheel $h'$ to form a reducing-gear, and the hub of said gear carries one member of a clutch M, the other member of which is carried by the shaft carrying toothed feed-wheel F. The clutch-operating lever M' is connected to the clutch, as clearly shown in Fig. 6. The clutch members engage by interlocking teeth, as shown, so that the relative position of feed-wheel, teeth, and armature-coils shall be the same whenever they are connected together, thereby insuring the proper presentation of the transmitting-perforations in the tape to the transmitting-brushes. The proportioning of the gear feed-wheel and tape-perforations beneath the brushes D D and the adjustment of the brushes longitudinally with respect to the tape are such that having regard to the difference in phase between the impressed electromotive-force wave and the actual or resultant waves of current-flow the instants of make and break of connection shall coincide approximately with the zeros of current-flow produced by the electromotive forces developed in the armature.

I is the paper-trough, through which the paper is fed by wheel F, and F' is a pressure-wheel, which keeps the paper engaged by wheel F. Wheel F' is supported on a pivoted arm pressed down by a spring, as shown in Fig. 8. The bottom of the trough is perforated immediately beneath the tips of the transmitting-brushes D D, as clearly shown in Fig. 6, to permit said brush to meet the tips of brushes D' D' beneath the trough through the perforation in the paper.

R is a rotatable block or hub of insulation turning on a pin carried by lever P, consisting of a pivoted elbow-lever, as shown in Fig. 7, and supporting-brushes D D. A spring S, applied to the hub as shown, holds the brushes down upon the perforated tape. By manipulating lever P to raise the hub the brushes may be raised from the paper.

While we prefer to use a varying electromotive force of the sine form, it is not to be understood that we limit ourselves thereto, but desire to include by our claims any forms whose characteristic difference from the square-topped electromotive-force wave heretofore used is that the electromotive force shall change gradually and continuously from zero through a maximum to zero. It is also to be understood that we do not limit ourselves to using electromotive forces of opposite signs, as the transmission might be effected by using electromotive forces of one sign only.

The invention claimed is—

1. The hereinbefore-described improvement in ocean-cable telegraphy which consists in transmitting the signaling waves or pulses by impressing upon the cable distinct pulses of electromotive force varying in number or order of succession and changing gradually and continuously from zero through a maximum to zero.

2. The hereinbefore-described improvement in ocean-cable telegraphy which consists in transmitting the signaling waves or pulses by impressing upon the cable distinct pulses of electromotive force varying in number or order of succession and changing gradually and continuously from zero through a maximum to zero and adjusting the instants of make and break in the transmitter to the difference in phase between the impressed electromotive-force wave and the resultant waves or pulses of current.

Signed at New York, in the county of New York and State of New York, this 24th day of October, A. D. 1898.

ALBERT C. CREHORE.
GEORGE O. SQUIER.

Witnesses:
C. L. BELCHER,
WM. H. CAPEL.